(12) United States Patent
Patton

(10) Patent No.: US 12,046,224 B2
(45) Date of Patent: Jul. 23, 2024

(54) WEARABLE AUDIO DEVICE WITH ACTIVE EXTERNAL AUDIO MITIGATION

(71) Applicant: SAMSUNG ELECTRONICS CO., LTD., Gyeonggi-Do (KR)

(72) Inventor: Brian R. Patton, San Francisco, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 49 days.

(21) Appl. No.: 17/699,115

(22) Filed: Mar. 19, 2022

(65) Prior Publication Data

US 2023/0298556 A1    Sep. 21, 2023

(51) Int. Cl.
*H04R 1/10* (2006.01)
*G10K 11/178* (2006.01)
*G06F 3/16* (2006.01)

(52) U.S. Cl.
CPC .... *G10K 11/1781* (2018.01); *G10K 11/17885* (2018.01); *H04R 1/1083* (2013.01); *G06F 3/165* (2013.01); *G10K 2210/1081* (2013.01); *G10K 2210/3046* (2013.01); *H04R 2460/01* (2013.01)

(58) Field of Classification Search
CPC ......... G10K 11/1781; G10K 11/17885; G10K 2210/1081; G10K 2210/3046; H04R 1/1083; H04R 2460/01; G06F 3/165
USPC ....................................................... 381/71.2
See application file for complete search history.

(56) References Cited

U.S. PATENT DOCUMENTS

| 9,367,613 | B1 | 6/2016 | Tome |
| 9,716,939 | B2 | 7/2017 | Di Censo et al. |
| 10,595,114 | B2* | 3/2020 | Reily ................ H04R 5/033 |
| 10,679,602 | B2 | 6/2020 | Lovitt et al. |
| 10,951,990 | B2* | 3/2021 | Nawfal ............... H04R 5/04 |
| 2014/0010378 | A1* | 1/2014 | Voix .................. H04R 1/1083 381/57 |
| 2020/0051566 | A1 | 2/2020 | Shin |
| 2020/0077170 | A1* | 3/2020 | Wexler ............. H04R 1/1016 |
| 2020/0380945 | A1 | 12/2020 | Woodruff et al. |
| 2022/0130392 | A1* | 4/2022 | Ko .................. H04M 1/72412 |
| 2022/0165305 | A1* | 5/2022 | Jun ................... G11B 20/10037 |

OTHER PUBLICATIONS

"Latest List of June's Cook-Programs and Food ID items," [Online] June Life Inc. © 2020, Jan. 17, 2018, retrieved from the Internet: <https://support.juneoven.com/hc/en-us/articles/360000081813-Latest-List>, 5 pg.

(Continued)

*Primary Examiner* — Carolyn R Edwards
*Assistant Examiner* — Friedrich Fahnert
(74) *Attorney, Agent, or Firm* — Cuenot, Forsythe & Kim, LLC

(57) ABSTRACT

A wearable audio device includes a microphone, a speaker, and a hardware processor. The microphone is configured to receive external audio. The speaker configured to produce internal audio. The hardware processor is operably connected to the microphone and speaker. A comparison of the external audio to the internal audio is performed, and a notification is generated based upon the comparison determining that the external audio matches the internal audio.

20 Claims, 7 Drawing Sheets

(56) References Cited

OTHER PUBLICATIONS

"Shazam," [Online] Apple Inc. © Copyright 2022 [retrieved Feb. 24, 2022], retrieved from the Internet: <https://www.shazam.com/>, 8 pg.
Kumar, K., "Song stuck in your head? Just hum to search," [Online] Google, Inc., The Keyword, Oct. 15, 2020, retrieved from the Internet: <https://blog.google/products/search/hum-to-search/>, 2 pg.
Klapuri, A. "Pattern Induction and Matching in Music Signals," CMMR 2010: International Symposium on Computer Music Modeling and Retrieval, Jun. 21, 2010, pp. 188-204.
Ono, N. et al., "Separation of a Monaural Audio Signal Into Harmonic/Percussive Components by Complementary Diffusion on Spectrogram," in 16th European Signal Processing Conference, Lausanne, Switzerland, Aug. 25, 2008, pp. 240-244.
Triggs, R. "Android's Bluetooth latency needs a serious overhaul," [Online] SoundGuys © 2022, Mar. 6, 2021, retrieved from the Internet: <https://www.soundguys.com/android-bluetooth-latency-22732/>, 5 pg.
"2020:Query by Tapping," [Online] Music Information Retrieval Evaluation exchange, Mirex Wiki, Jun. 1, 2020, retrieved from the Internet: <https://www.music-ir.org/mirex/wiki/2020:Query_by_Tapping>, 5 pg.

\* cited by examiner

WEARABLE AUDIO DEVICE WITH ACTIVE EXTERNAL AUDIO MITIGATION

CROSS-REFERENCE TO RELATED APPLICATIONS

None.

TECHNICAL FIELD

This disclosure relates to wearable audio devices, and more particularly, to a wearable audio device that is configured to identify and discourage user-generated audio.

BACKGROUND

Wearable audio devices, including devices such as headphones and earbuds, typically perform two functions. One function is to generate audio (i.e., sound) to be heard by a listener. The second function is to reduce generally-unwanted external/ambient audio. As used herein, the term "internal audio" is defined as audio generated by a wearable audio device, and the term "external audio" is defined as audio generated externally to the wearable audio device, such as environmental/ambient audio.

Wearable audio devices generally use two approaches to reducing unwanted external audio—passive and active. There are many approaches to passive noise reduction. For example, earbuds are designed to fit within the ear canal so as to prevent/reduce external sound waves from passing through the ear canal. Alternatively, ear cups surround the entire ear and also serve to prevent/reduce external sound waves from entering the ear canal. An active approach to noise reduction is frequently referred to as active noise cancellation (ANC). ANC involves the use of one or more microphones to detect and analyze ambient noise. That ambient noise is simultaneously played back but with an added 180° phase shift in the acoustic wave. This results in destructive interference of the sound waves transmitted to the user and cancelling (to a large extent) the audible noise.

The effectiveness of wearable audio devices in reducing external audio, however, can produce an unwanted side effect. In particular, the reduction of the external audio may reduce the user's ability to be aware of situations when the user is the one producing the external audio. For example, if the user is playing music using the wearable audio device, the user may sing/tap/hum along with the music without realizing that this is occurring. In many instances, this is not a problem. However, in particular environments, such as an office space or a communal setting with other people in listening range, the user singing/tapping/humming along to the internal audio may be distracting to the people around the user and embarrassing, in hindsight, to the user.

SUMMARY

In an example implementation, a wearable audio device includes a microphone, a speaker, and a hardware processor. The microphone is configured to receive external audio. The speaker configured to produce internal audio. The hardware processor is operably connected to the microphone and speaker. A comparison of the external audio to the internal audio is performed, and a notification is generated based upon the comparison determining that the external audio matches the internal audio.

Other aspects of this example implementation include the comparison being performed by the hardware processor. Alternatively, the comparison is performed by an external device operably connected to the wearable audio device. The external audio is digitized into input audio data, the internal audio is generated using output audio data, and the comparison includes performing a similarity analysis between the input audio data and the output audio data. The wearable audio device can include an inertial measurement unit, and the comparison includes data from the inertial measurement unit in which a similarity analysis between the data from the inertial measurement unit and the external audio is performed.

The notification can include changing a characteristic of the internal audio being produced by the speaker. In another aspect, the notification includes a predefined audio signal that is produced by the speaker. The hardware processor can be configured to perform active noise cancellation, and the notification includes disabling the active noise cancellation performed by the hardware processor. In yet another aspect, the notification is provided to an external device operably connected to the wearable audio device. Also, the notification can be location aware.

In another example implementation, a method within a wearable audio device having a microphone, a speaker, and a hardware processor includes the following operations. External audio is received by the microphone. Internal audio is produced by the speaker. A comparison is performed, by the hardware processor, of the external audio to the internal audio is performed. A notification is generated, by the hardware processor, based upon the comparison determining that the external audio matches the internal audio.

This Summary section is provided merely to introduce certain concepts and not to identify any key or essential features of the claimed individual matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1A:
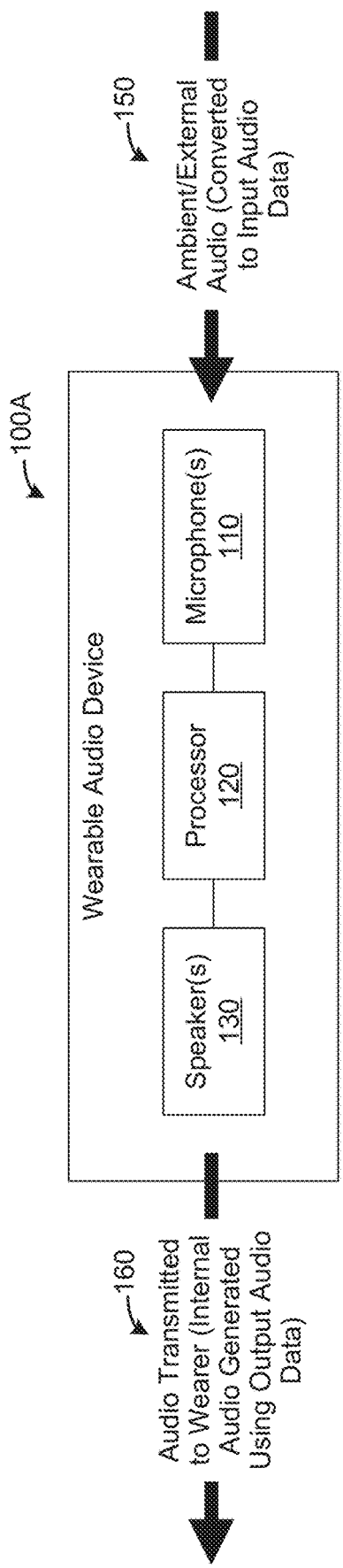
FIGS. 1A and 1B are block diagrams respectively illustrating different aspects of a wearable audio device.
Figure 1B:
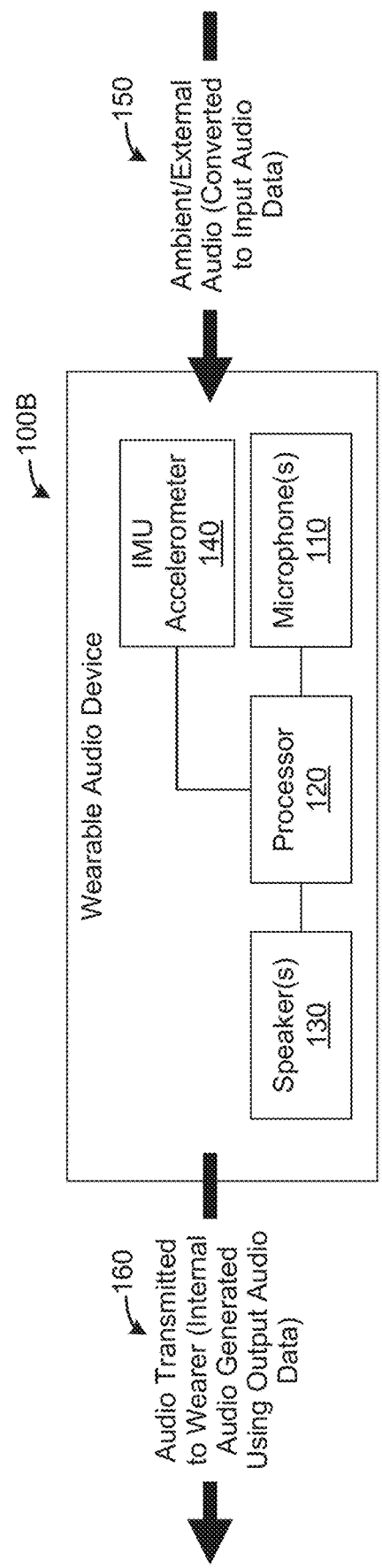

FIGS. 1A and 1B illustrate different aspects of a wearable audio device 100A, 100B according to the disclosure. Methods 200, 300 associated with these wearable audio devices 100A, 100B are respectively illustrated in FIGS. 2 and 3.

The wearable audio device 100A, 100B includes at least one microphone 110, one or more speakers 130, and a processor 120 that is operably connected to both the microphone(s) 110 and speaker(s) 130. With reference to FIG. 1B, the wearable audio device 100B can also include device 140 for measuring motion, such as a uniaxial or triaxial accelerometer, gyroscope and/or magnetometer. An example of this is a chip-scale inertial measurement unit (IMU). The microphone(s) 110, processor 120, speaker(s) 130, and IMU 140 are components that can be found in known wearable audio devices, and the present wearable audio device 100A, 100B is not limited as to a particular type of any these components 110, 120, 130, 140.

As discussed in greater detail below, the microphone(s) 110 is configured to receive external audio. The speaker(s) 130 is configured to produce internal audio. The processor 120 is operably connected to the microphone(s) 110 and speaker(s) 130. A comparison of the external audio to the internal audio is performed, and a notification is generated based upon the comparison determining that the external audio matches the internal audio.

Consistent with known wearable audio devices, the microphone(s) 110 is configured to pick up external audio (e.g., ambient sounds including those made by the user) and digitize the external audio as input audio data. Alternatively, the digitizing function could be performed by the processor 120. Also, consistent with known wearable audio devices, the speaker(s) 130 is configured to generate the external audio using output audio data. Although illustrated as part of the wearable audio device 100A, 100B, in certain aspects, the microphone(s) 110 can be found within an external device such as a smartphone 630 or computer 640 (illustrated in FIG. 6).

Although not required, in certain aspects, the processor 120 can include conventional active noise cancellation (ANC) capabilities. As recognized by those skilled in the art, there are many techniques for ANC, and the processor 120 is not limited as to a particular approach. In general terms, ANC performs an analysis on the incoming external audio (i.e., the input audio data) and subsequently generates a signal that will either phase shift or invert the polarity of the external audio. This generated signal is played using the speaker(s) 130 to create a sound wave with the same amplitude but with an inverted phrase relative to the original sound (i.e., the external audio), which results in acoustic attenuation of the original sound.

Figure 2:
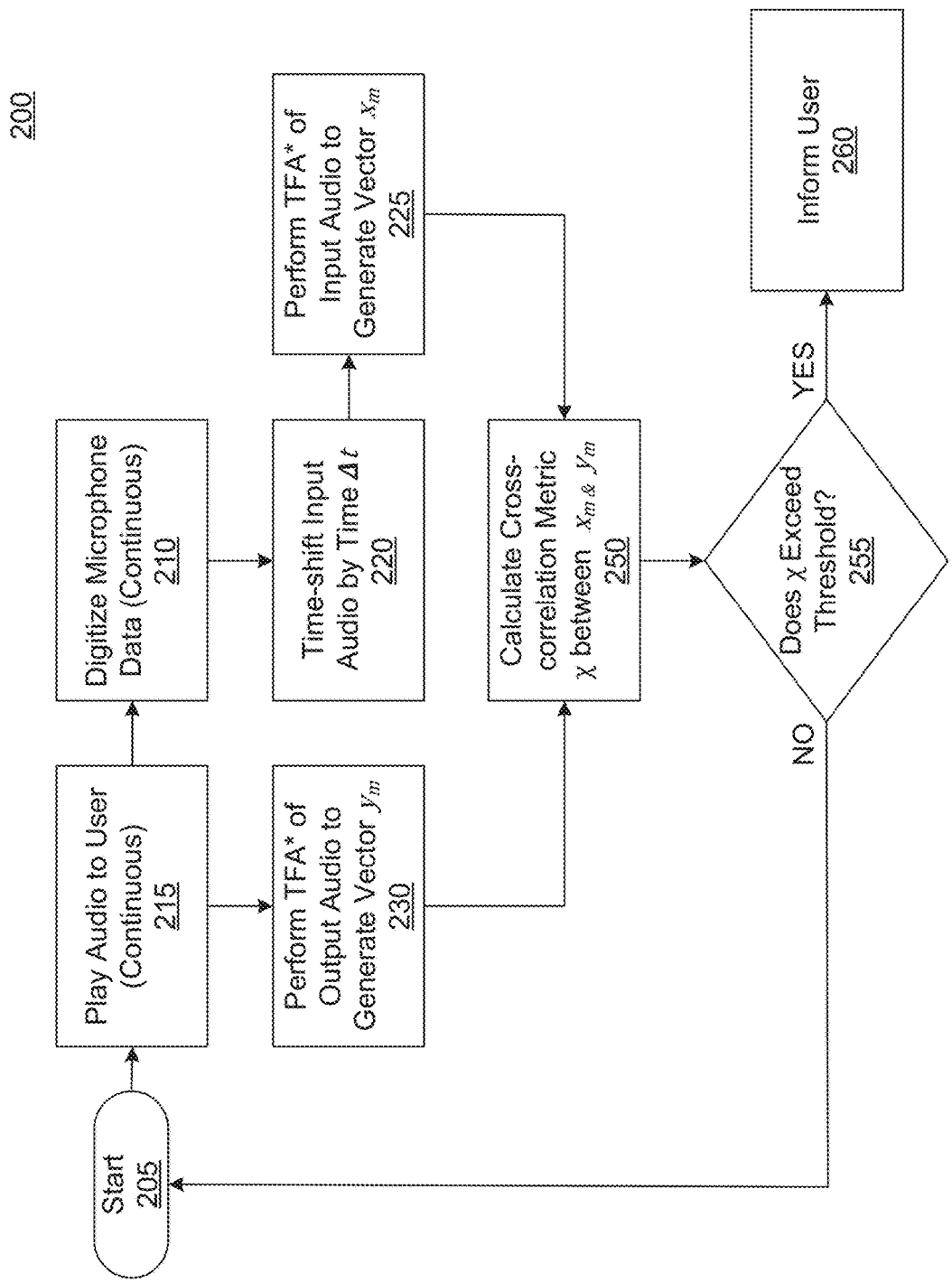
FIG. 2 is a flowchart of an example method of using the wearable audio device of FIG. 1A.
Figure 3:
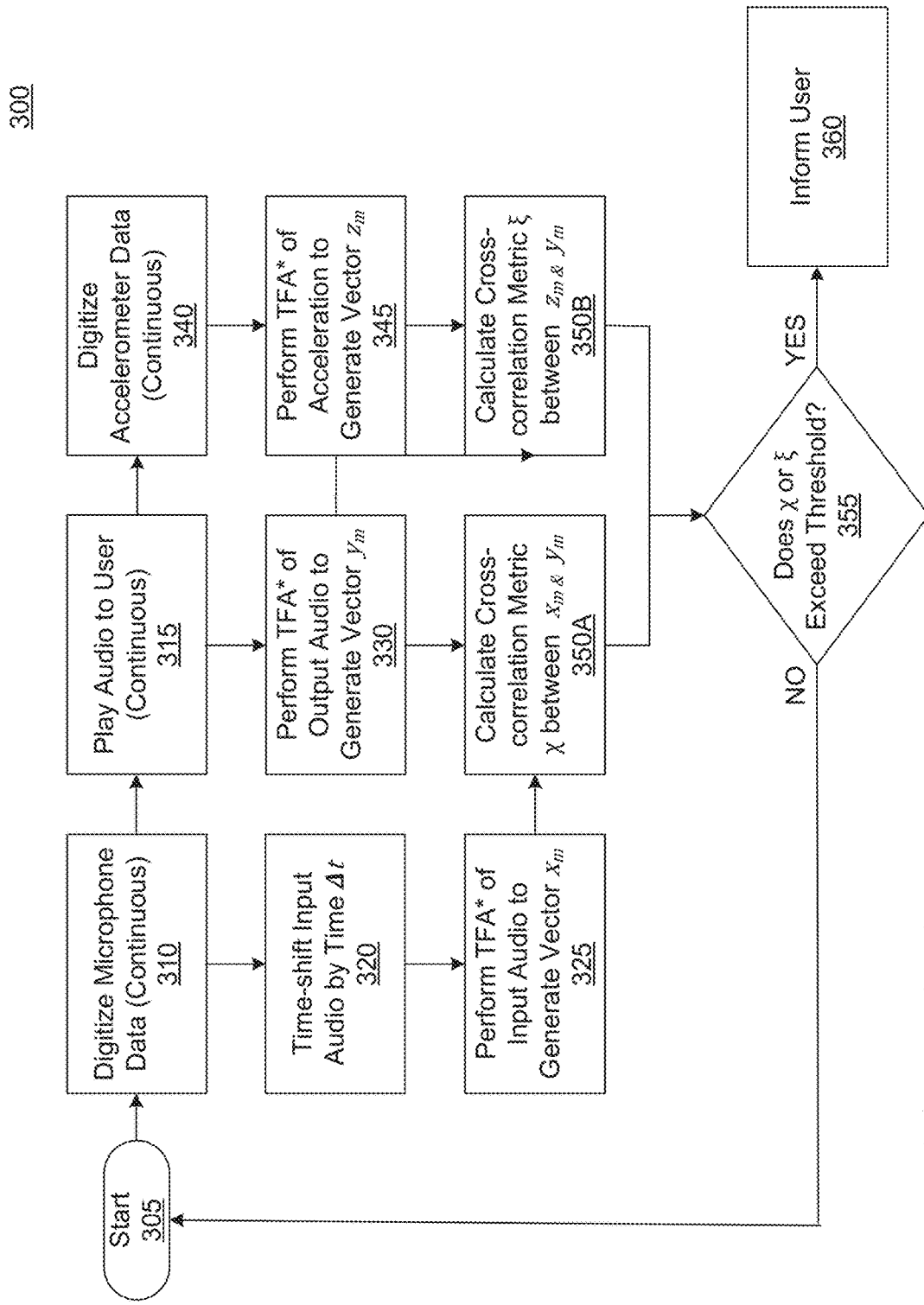
FIG. 3 is a flowchart of an example method of using the wearable audio device of FIG. 1B.
Figure 5:
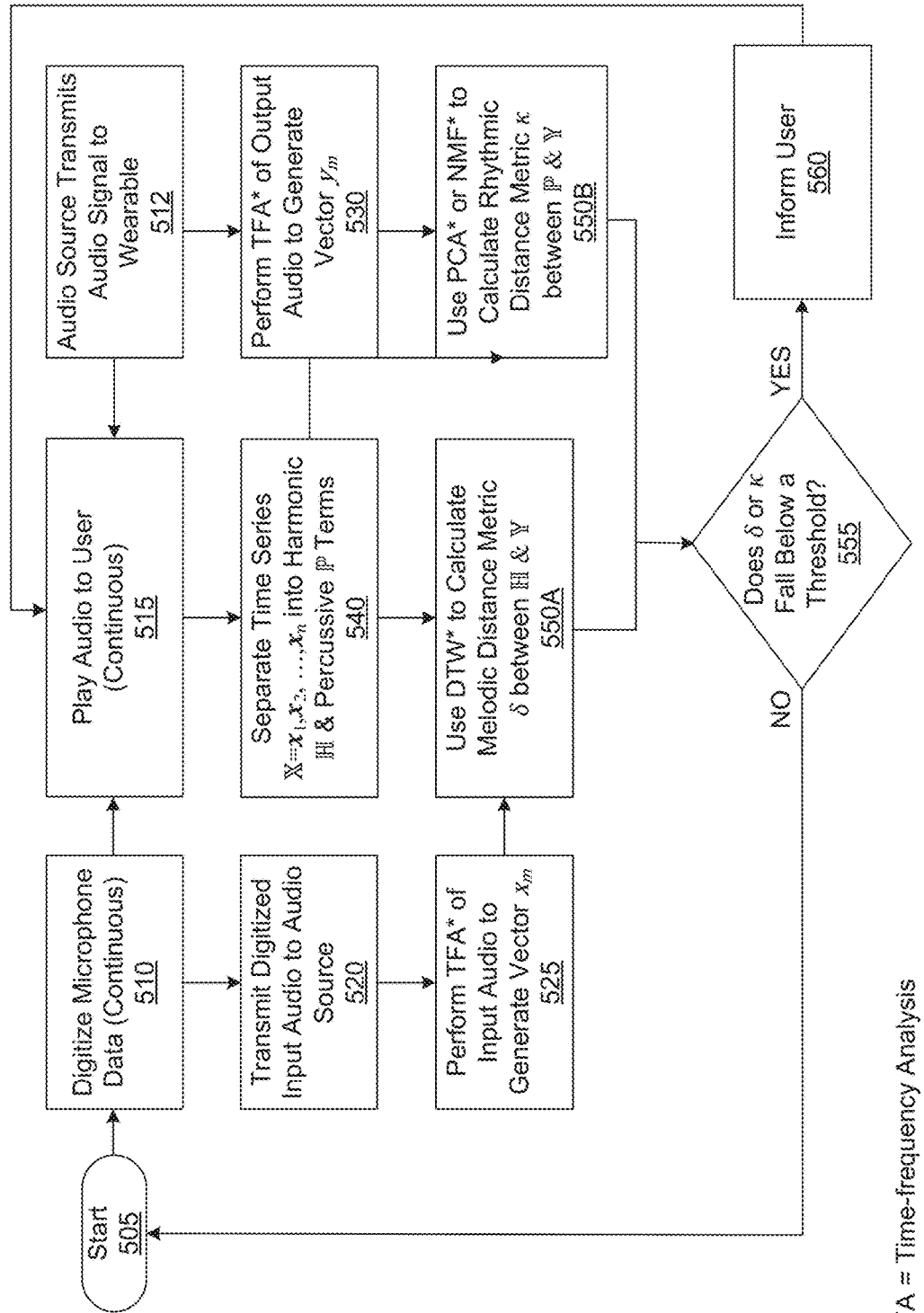
FIG. 5 is a flowchart of an example method of using the wearable audio device of FIG. 4.

As described in more detail below, the processor 120 is employed to perform a similarity analysis on the input audio data and the output audio data. In aspects in which the processor 120 includes ANC capability, the input audio data used for the ANC can also be used during the similarity analysis. The purpose of performing the similarity analysis is to determine whether or not the user is generating external audio that is similar to the internal audio being played by wearable audio device 100A, 100B. Many different techniques for performing a similarity analysis between two different sets of audio data are known to those skilled in the art, and the present wearable audio device 100A, 100B is not limited as to a particular approach so capable. While FIGS. 2, 3, and 5 illustrate three different techniques, other techniques to performing the similarity analysis are also within the scope of the described inventive arrangements. These additional capabilities of the processor 120 are described with reference to methods 200, 300, 500 respectively illustrated in FIGS. 2, 3, and 5.

As compared to known similarity analysis (e.g., that typically used for general song-finding applications), the similarity analysis performed in conjunction with the wearable audio device 100A, 100B can be simplified. Prior implementations of similarity analysis are typically performed to identify one audio stream (i.e., a target pattern) from a database of audio streams using a query pattern (e.g., a snippet of another audio stream). In such an instance, the audio stream to be identified is unknown and the query pattern is being compared to not only a multitude of different audio streams but also different temporal portions of those different audio streams.

The present similarity analysis according to the described inventive arrangements avoids the problem of searching a database using a query pattern since both audio streams (i.e., the output audio data and the input audio data) are known. Additionally, the present similarity analysis can employ an assumption that the respective audio streams (i.e., the output audio data and the input audio data) are temporally matched (i.e., they are generally synchronous). Consequently, the present similarity analysis does not need to either search a database for a potential match or perform a comparison of the query pattern to different temporal selections of a potential match.

In general, the two categories for general music identification algorithms include matching melodic signatures and matching rhythm signatures. Melodic pattern matching in the presence of time-shift and time-scale uncertainties can still be successful if dynamic time warping is used. Strict melodic pattern matching can be hindered by pitch shifts between the source and target patterns, but this problem can be addressed by performing comparisons of relative pitch (on a logarithmic scale). Rhythmic pattern matching (e.g., "query by tapping") allows users to tap out the rhythm of a song and then search for the source in a database. Methods of extracting rhythm information include dimensional reduction via principal component analysis and non-negative matrix factorization, among others.

As described below, a computationally simpler approach for audio pattern matching (i.e., the similarity analysis) involves calculating a distance metric between source and target patterns assuming a fixed time offset and no temporal scaling. If temporal scaling is unknown or if timing offsets are variable, dynamic time warping can be combined with pairwise distance metric calculation over the range of possible time offsets. This has previously been shown to be successful for matching similar (though not necessarily identical) audio signals. The smaller that range of possible time offsets, the less computationally intensive the algorithm. Additionally, the similarity analysis can include resolving the source pattern (i.e., input audio data) into melodic and rhythmic components. This approach, while useful, is computationally more intensive.

Figure 6:
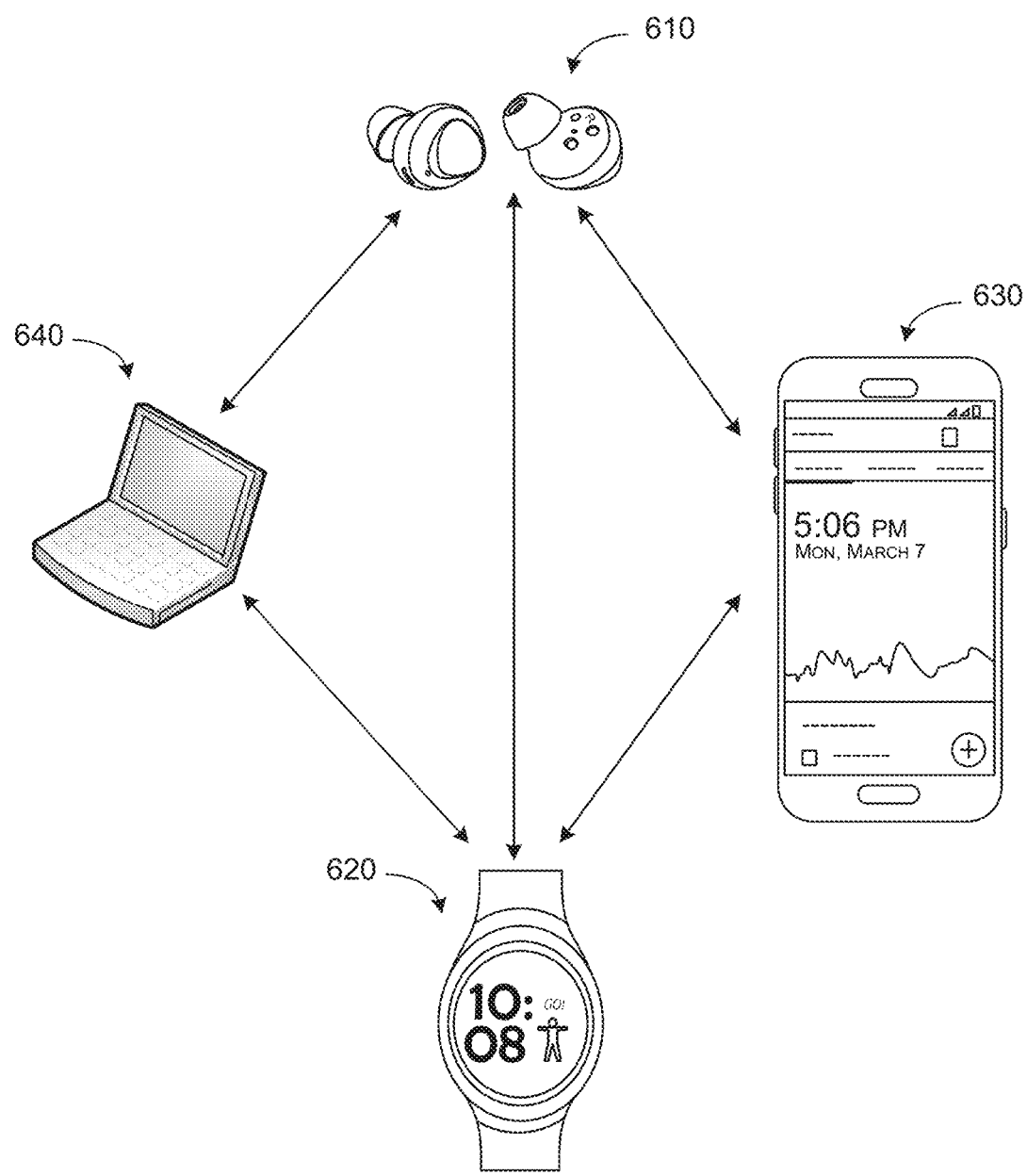
FIG. 6 illustrates a wearable audio device operably connected to external devices.

FIG. 2 illustrates an example method 200 for use with the wearable audio device 100A. At block 205, the method 200 begins. At block 215, the speaker(s) 130 continuously generates internal audio for the user, and the manner in which this internal audio generated is not limited. In certain aspects, output audio data is used to generate the internal audio, and this output audio data can be stored internally within the wearable audio device 100A. Alternatively, the output audio data used to generate the internal audio can be stored externally from the wearable audio device 100A (e.g., in an external device such as a smartphone 630 or computer 640, as illustrated in FIG. 6) and streamed to the wearable audio device 100A.

Blocks 210, 220, 225, 230, and 250 illustrate portions of the present similarity analysis. In block 210, the external audio received by the microphone 110 is digitized as input audio data. Although not limited in this manner, the external audio (i.e., as a query pattern) can be digitized at a sampling rate that fulfills the Nyquist criterion for the maximum frequencies of interest (e.g., 40,000 samples per second if the maximum frequency to be analyzed is 20 kHz).

In block 230, the processor 120 can perform a time-frequency analysis (e.g., a short-time Fourier transform or constant-Q transform) on the output audio data to generate a vector $y_m$. In block 220, the input audio data is time shifted relative to the output audio data by some $\Delta t$. This $\Delta t$ can vary based upon the amount of time taken to digitize the external audio into the input audio data. In block 225, the processor 120 can perform a time-frequency analysis (e.g., a short-time Fourier transform or constant-Q transform) on the input audio data to generate a vector $x_m$. For example, if the comparison between the query pattern and the target pattern is to be performed according to pitch, both signals should undergo time-frequency analysis by, for example, performing a short-time Fourier transform (STFT) that calculates the frequency spectrum of each signal in short (e.g., <1 second) time bins. The result is a time series of vectors $x_1$, $x_2$, ..., $x_n$, with each vector containing information about the frequency spectrum. In certain situations, a "constant-Q" transform is used in lieu of the STFT, since its output frequency spectrum has bins that are geometrically spaced (much in the way that musical notes are geometrically spaced in frequency). The series of vectors $x_1, x_2, \ldots, x_N$ are collectively denoted as a two-dimensional array $\mathbb{X}$..

In block 250, a cross-correlation metric $\chi$ between $z_m$ and $y_m$ is generated. In block 255, the similarity measure (e.g., cross-correlation metric $\chi$) is compared to a predetermined threshold value, and this comparison indicates whether or not the user is generating external audio that is similar to the internal audio being played by wearable audio device 100A.

At block 260, based upon a determination that the comparison between the cross-correlation metric $\chi$ between $x_m$ and $y_m$ indicates that the user is generating external audio that is similar to the internal audio being played by wearable audio device 100A, 100B, a notification is presented to the user. There are several different approaches by which a notification can be presented to the user, and the present wearable audio device 100A, 100B is not limited as to a particular approach. In one approach, the processor 120 can cause a predetermined sound to be played by the speaker(s) 130, which would indicate, to the user, that the user is generating external audio that is similar to the internal audio being played. Still another approach would have the processor 120 change some characteristic of the internal audio being generated by the speaker(s) 130. For example, the processor 120 could lower the volume of the internal audio. As another example, the notification could include deactivating active noise cancellation being performed by the processor 120. In yet another approach, the processor 120 can cause a light to be projected, as a visual cue.

Although the aforementioned notifications include the notification being performed by the wearable audio device 100A, 100B itself, there are alternative implementations of the notification. For example, if the wearable audio device 100A, 100B is connected to an external device (e.g., a computer 640, smartphone 630, and smartwatch 620, as illustrated in FIG. 6), the notification could be presented to the user via the external device. Additionally, the form of the notification is not limited. For example, aside from an audio notification by the wearable audio device 100A, 100B, the notification can be made visually (e.g., by text from the computer 640 or smart phone 630) or by haptics (e.g., via the smartwatch 620). Other approaches, not described herein, to performing the notification that the user is generating external audio that is similar to the internal audio being played by wearable audio device 100A, 100B are also within the scope and spirit of the described inventive arrangements.

Although not limited in this matter, issuance of the notification can be location aware. As used herein, the term "location aware" is defined as having issuance of the notification being dependent upon a location of the user. In particular, depending upon the location of the user, the notification can be generated, as discussed above, or suppressed. One portion of the location aware aspect of the wearable audio device 100A, 100B involves knowing the location of the user, and how the location of the user is known is not limited as to a particular approach. Many types of known techniques are available to determine a specific location of an electronic device, such as the wearable audio device 100A, 100B, and the present inventive arrangement is not limited as to any of these techniques.

Once the location of the wearable audio device 100A, 100B (and hence, the user) is known, this location can be compared to a database of user-defined locations. For example, the user may choose to designate a work location as one of the user-defined locations. Regardless of the approach, the user can control whether the location of the user is a basis by which to notify the user that the user is generating external audio that is similar to the internal audio being played by the wearable audio device 100A, 100B. The actual control of the issuance of the notification is not limited as to particular approach. For example, suppression of the notification can occur by not implementing the comparison operations 255, 355. Alternatively, suppression of the notification can occur by not implementing the internal/external audio analysis operations. In yet another alternative, the method 200/300 can proceed to the comparison operations 255, 355 but the notification is suppressed after the comparison operations 255, 355.

FIG. 3 illustrates example method 300 for use with the wearable audio device 100B. At block 305, the method 300 begins. As in block 110 in FIG. 2, in block 210, the speaker(s) 130 continuously generate internal audio for the user using output audio data. The operations illustrated in blocks 320, 325, 330, and 350A are the same as the operations illustrated in blocks 220, 225, 230, and 250 of FIG. 2.

The difference between the method 200 of FIG. 2 and the method 300 of FIG. 3 involves the use of the accelerometer or IMU 140. The accelerometer or IMU 140 is configured to sense percussive input (e.g., tapping) from the user, and the wearable audio device 100B is not limited to a particular accelerometer or IMU 140 so capable. For example, many existing earbuds and headphones already include an accelerometer or IMU 140 for input and spatial audio applications. An example of an accelerometer or IMU 140 includes a triaxial accelerometer, and triaxial acceleration data generated by the triaxial accelerometer can be summed in quadrature to yield a scalar acceleration magnitude.

Referring to block 340, data from the accelerometer or IMU 140 is continually digitized and forwarded to the processor 120. The processor 120 can then perform a time-frequency analysis (e.g., a short-time Fourier transform or constant-Q transform) on the acceleration data to generate a vector $z_m$. In block 350B, a cross-correlation metric between $z_m$ and $y_m$ is generated.

Similar to block 255 illustrated in FIG. 2, in block 355 the similarity measure(s) (e.g., $\chi$ and $\xi$) are respectively compared to predetermined threshold values, and this comparison indicates whether or not the user is generating external audio that is similar to the internal audio being played by wearable audio device 100B. As in block 260 illustrated in FIGS. 2, in block 360, based upon a comparison between the similarity measure(s) and the predetermined threshold value(s) indicating that the user is generating external audio that is similar to the internal audio being played by wearable audio device 400, a notification is presented to the user.

Figure 4:
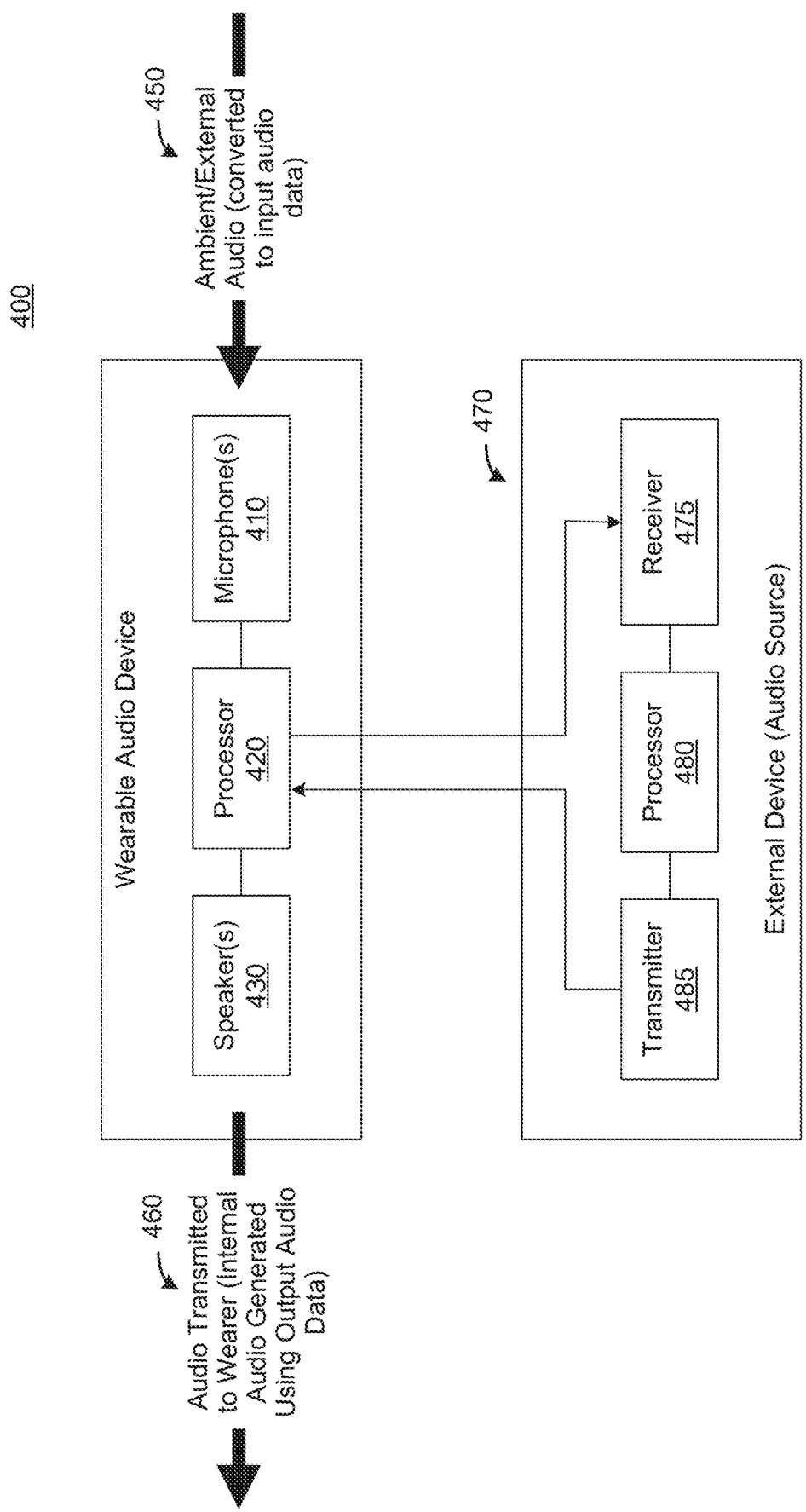
FIG. 4 is a block diagram illustrating a wearable audio device according to a different aspect.

FIG. 4 illustrates an alternative wearable audio device 400. Like the wearable audio devices 100A, 100B of FIGS. 1A and 1B, the wearable audio device 400 includes one or more microphones 410, a processor 420, and one or more speakers 430, which are configured to perform the known operations already described above. Although not necessary, the wearable audio devices 100A, 100B described above with regard to FIGS. 1A and 1B can be connected to an external device, and that external device can be the source of the audio data used to generate the internal audio. However, as illustrated in in FIG. 4, certain functions previously performed internally by the alternative wearable audio device 400 are offloaded to an external device 470. For example, the comparison operations previously performed by the processor 420 within the wearable audio device 400 can be offloaded to a processor 480 within the external device 470, as discussed in more detail with regard to FIG. 5 and method 500.

FIG. 5 illustrates example method 500 for use with the wearable audio device 400. At block 505, the method 500 begins. As in blocks 210, 310 respectively illustrated in FIGS. 2 and 3, in block 510, external audio received by the microphone(s) 410 is digitized to generate input audio data. Additionally, as in blocks 215, 315 respectively illustrated in FIGS. 2 and 3, in block 515, internal audio is produced by the speaker(s) 430 using output audio data.

The method 500 deviates from the methods 200, 300 respectively illustrated in FIGS. 2 and 3 by performing the portions of the similarity analysis external to the wearable audio device 400. As discussed above, there are multiple different approaches to performing the similarity analysis that looks at the similarity between the input audio data (i.e., the digitized external audio received from the microphone(s) 410) and the output audio data (i.e., the data used to generate the internal audio by the speaker(s) 430). In this instance, the similarity analysis illustrated in FIGS. 2 and 3 can be alternatively used in place of the similarity analysis illustrated in FIG. 5. However, prior to the analysis of the input audio, as part of the similarity analysis, the input audio is digitally transmitted to the external device 470 in block 520.

The similarity analysis of method 500 can include blocks 525, 530, 540, 550A, and 550B. In certain applications, it can be advantageous to decompose the query pattern $\mathbb{X}$ into a harmonic part $\mathbb{H}$ and a percussive part $\mathbb{P}$, so that $\mathbb{X}=\mathbb{H}+\mathbb{P}$, and this is a known decomposition. Non-negative matrix factorization is another approach that can be used in the time-frequency analysis of audio (e.g., music), with the non-negativity constraint arising from considering only positive frequencies and the vectors in $\mathbb{X}$ represent non-negative spectral power quantities. To match the query pattern $\mathbb{X}$ to the target pattern $\mathbb{Y}$, some metric of similarity (cross-correlation) is calculated—often referred to as a "distance metric." Using a distance metric, smaller values indicate a stronger correlation. Common distance metrics in music analysis include mean-squared error (equivalent to the Euclidean norm $\|x_n-y_m\|$) or the cosine distance. In a general scenario, the spectrum vectors may be compared at two different times, in which case $n \neq m$. The larger the potential time shift between the two audio signals, the more combinations of (n,m) need be calculated. Even allowing for a generous 1 second of digitization (block 510) and processing time by the similarity analysis and taking into account that practical Bluetooth latency can range from <30 ms to above 500 ms, depending on device (doubling that to account for the latency for the phone-to-earbuds and earbuds-to-phone transmission), it is estimated that there is at most a 2-second variable latency between the source and target patterns (i.e., the input audio data and the output audio data), with the target pattern always leading in time.

In 512, the external device 400 transmits the output audio data, via transmitter 485, to the wearable audio device 400 to be subsequently used by the speaker(s) 430 to generate the external audio. This same output audio data can be subsequently provided to the processor 480 of the external device 470. Referring to block 530, the processor 480 can perform a time-frequency analysis (e.g., a short-time Fourier transform or constant-Q transform) on the output audio data to generate a vector $y_m$. In block 550B, principal component analysis (PCA) or non-negative matrix factorization (NMF) can be used to calculate a rhythmic distance metric $\kappa$ between $\mathbb{P}$ and $\mathbb{Y}$, where $\mathbb{Y}$ is the target pattern.

Similar to blocks 225, 325 respectively illustrated in FIGS. 2 and 3, in block 525, the processor 480 can perform a time-frequency analysis (e.g., a short-time Fourier transform or constant-Q transform) on the input audio data to generate a vector $x_m$. In block 540, since the input audio data may be times-shifted in comparison to the output audio data, the processor 480 can perform a separate time series $\mathbb{X}=x_1, x_2, \ldots, x_n$ into harmonic $\mathbb{H}$ & percussive $\mathbb{P}$ terms. In block 550, the processor 480 can use dynamic time warping (DTW) to calculate melodic distance metric $\delta$ between $\mathbb{H}$ & $\mathbb{Y}$.

Similar to blocks 255, 355 respectively illustrated in FIGS. 2 and 3, in block 555 the similarity measure(s) (e.g., $\delta$ and $\kappa$) are respectively compared to predetermined threshold values, and this comparison indicates whether or not the user is generating external audio that is similar to the internal audio being played by wearable audio device 400. Although not illustrated, the IMU 140 of FIG. 1B and the methodology associated therewith (i.e., blocks 340, 345, 350B from FIG. 3) can be incorporated into the wearable audio device 400 and method 500.

As in blocks 260, 360 respectively illustrated in FIGS. 2 and 3, in block 560, based upon a comparison between the similarity measure(s) and the predetermined threshold value(s) indicating that the user is generating external audio that is similar to the internal audio being played by wearable audio device 400, a notification is presented to the user. The notification operation can be performed in the wearable audio device 400 or the external device 470. If, for example, block 555 is performed in the external device 470 and block 560 is performed in the wearable audio device 400, then the transmitter 485 can transmit a result of the comparison of block 555 to the processor 420 within the wearable audio device 400. As another alternative, if block 560 is performed by the external device 470 and the notification involves the wearable audio device 400, the transmitter 485 can transmit the notification (or indicator thereof) to the processor 420 within the wearable audio device 400.

FIG. 6 illustrates an example wearable audio device 610 connected to one or more external devices, such as a smartwatch 620, a smartphone 630, and a laptop computer 640.

Figure 7:
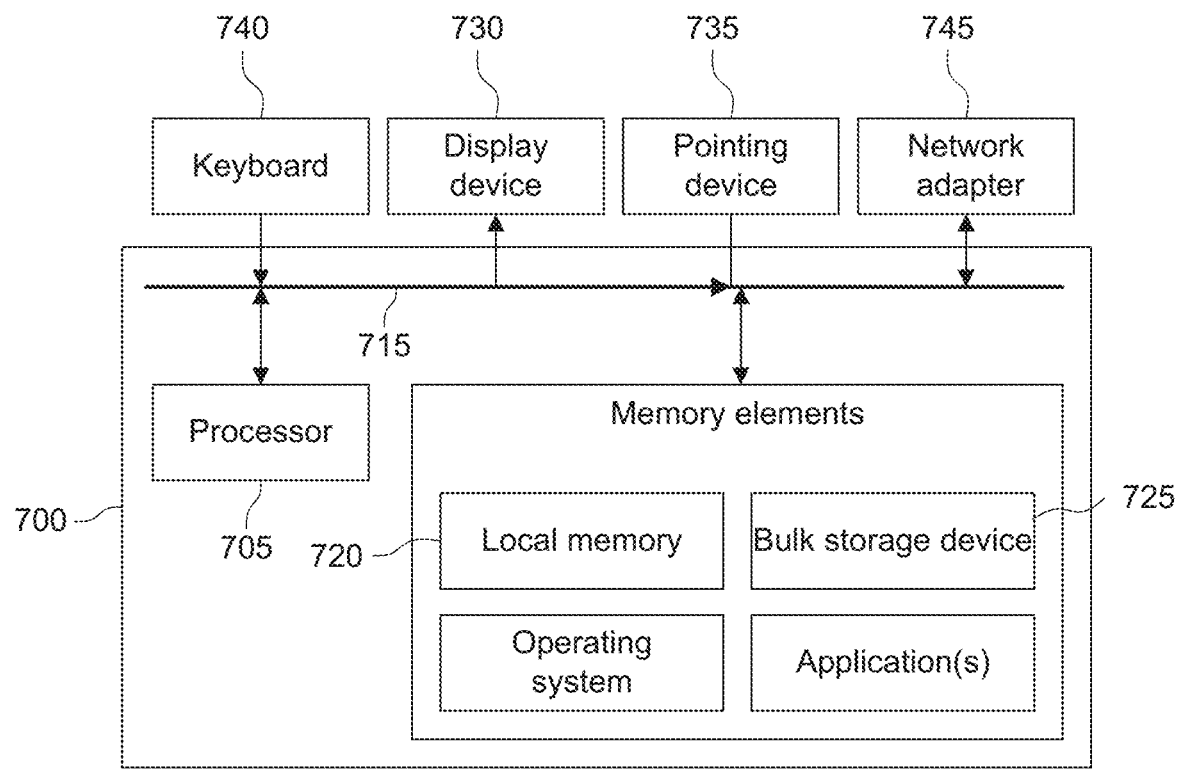
FIG. 7 is a block diagram illustrating an example of a computer hardware system.

FIG. 7 is a block diagram illustrating example architecture for a data processing 700, such as the computer 640 illustrated in FIG. 6. The data processing system 700 can include at least one processor 705 (e.g., a central processing unit) coupled to memory elements 710 through a system bus 715 or other suitable circuitry. As such, the data processing system 700 can store program code within the memory elements 710. The processor 705 can execute the program code accessed from the memory elements 710 via the system bus 715. It should be appreciated that the data processing system 700 can be implemented in the form of any system including a processor and memory that is capable of performing the functions and/or operations described within this specification. For example, the data processing system 700 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 710 can include one or more physical memory devices such as, for example, local memory 720 and one or more bulk storage devices 725. Local memory 720 refers to random access memory (RAM) or other non-persistent memory device(s) generally used during actual execution of the program code. The bulk storage device(s) 725 can be implemented as a hard disk drive (HDD), solid state drive (SSD), or other persistent data storage device. The data processing system 700 also can include one or more cache memories (not shown) that provide temporary storage of at least some program code in order to reduce the number of times program code must be retrieved from the local memory 720 and/or bulk storage device 725 during execution.

Input/output (I/O) devices such as a display 730, a pointing device 735 and, optionally, a keyboard 740 can be coupled to the data processing system 700. The I/O devices can be coupled to the data processing system 700 either directly or through intervening I/O controllers. For example, the display 730 can be coupled to the data processing system 700 via a graphics processing unit (GPU), which may be a component of the processor 705 or a discrete device. One or more network adapters 745 also can be coupled to data processing system 700 to enable the data processing system 700 to become coupled to other systems, computer systems, remote printers, and/or remote storage devices through intervening private or public networks. Modems, cable modems, transceivers, and Ethernet cards are examples of different types of network adapters 745 that can be used with the data processing system 700.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "real time" means a level of processing responsiveness that a user or system senses as sufficiently immediate for a particular process or determination to be made, or that enables the processor to keep up with some external process.

As defined herein, the term "automatically" means without human intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, "data processing system" means one or more hardware systems configured to process data, each hardware system including at least one processor programmed to initiate operations and memory.

As defined herein, "execute" and "run" comprise a series of actions or events performed by the processor in accordance with one or more machine-readable instructions. "Running" and "executing," as defined herein refer to the active performing of actions or events by the processor. The terms run, running, execute, and executing are used synonymously herein.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "individual" and "user" each refer to a human being.

As defined herein, the term "processor" means at least one hardware circuit (i.e., a hardware processor). The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" and similar language as described above, (e.g., "if," "when," or "upon,") mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "server" means a data processing system configured to share services with one or more other data processing systems. Relatedly, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television, and the like. In one or more embodiments, the various user devices described herein may be client devices. Network infrastructure, such as routers, firewalls, switches, access points and the like, are not client devices as the term "client device" is defined herein.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present disclosure. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration and are not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Further, the terms and phrases used within this disclosure are not intended to be limiting, but rather to provide an understandable description of the features described. Any specific structural and functional details described are not to be interpreted as limiting, but merely as a basis for the claims and as a representative basis for teaching one skilled in the art to variously employ the features described in virtually any appropriately detailed structure. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A wearable audio device, comprising:
a microphone configured to receive ambient sounds originating from a user of the wearable audio device;
a speaker configured to produce internal audio from playback of output audio data, wherein the speaker is configured to direct the internal audio into an ear of the user of the wearable audio device; and
a hardware processor operably connected to the microphone and to the speaker, wherein:
a comparison of the ambient sounds to the output audio data is performed; and
a notification is generated based upon the comparison determining that the ambient sounds match the output audio data.

2. The wearable audio device of claim 1, wherein:
the comparison is performed by the hardware processor; or
the comparison is performed by an external device operably connected to the wearable audio device.

3. The wearable audio device of claim 1, wherein the wearable audio device comprises one or more earbuds or headphones.

4. The wearable audio device of claim 1, wherein:
the notification includes changing a characteristic of the internal audio being produced by the speaker; or
the notification includes a predefined audio signal that is produced by the speaker.

5. The wearable audio device of claim 1, wherein the comparison compares a query pattern corresponding to the ambient sounds with a query pattern corresponding to the output audio data.

6. The wearable audio device of claim 1, wherein:
the hardware processor is configured to perform active noise cancellation; and
the notification includes disabling the active noise cancellation performed by the hardware processor.

7. The wearable audio device of claim 1, wherein the notification is provided to an external device operably connected to the wearable audio device.

8. The wearable audio device of claim 1, wherein the notification is location aware.

9. The wearable audio device of claim 1, wherein:
the ambient sounds are digitized into input audio data;
the internal audio is generated using the output audio data; and
the comparison includes performing a similarity analysis between the input audio data and the output audio data.

10. The wearable audio device of claim 1, further comprising:
an inertial measurement unit;
wherein the comparison includes data from the inertial measurement unit.

11. The wearable audio device of claim 10, wherein the comparison includes a similarity analysis between the data from the inertial measurement unit and the output audio data.

12. A method within a wearable audio device having a microphone, a speaker, and a hardware processor, comprising:
receiving, by the microphone, ambient sounds originating from a user of the wearable audio device;
producing, by the speaker, internal audio from playback of output audio data, wherein the speaker is configured to direct the internal audio into an ear of the user of the wearable audio device;
performing, by the hardware processor, a comparison of the ambient sounds to the output audio data; and
generating a notification, by the hardware processor, based upon the comparison determining that the ambient sounds match the output audio data.

13. The method of claim 12, wherein:
the notification includes changing a characteristic of the internal audio being produced by the speaker; or
the notification includes a predefined audio signal that is produced by the speaker.

14. The method of claim 12, wherein the wearable audio device comprises at least one of one or more earbuds or headphones.

15. The method of claim 12, further comprising:
performing, by the hardware processor, active noise cancellation; and
the notification includes disabling the active noise cancellation performed by the hardware processor.

16. The method of claim 12, wherein the comparison compares a query pattern corresponding to the ambient sounds with a query pattern corresponding to the output audio data.

17. The method of claim 12, wherein the notification is location aware.

18. The method of claim 12, wherein:
the ambient sounds are is digitized into input audio data;
the internal audio is generated using the output audio data; and
the comparison includes performing a similarity analysis between the input audio data and the output audio data.

19. The method of claim 12, wherein the comparison includes data from an inertial measurement unit of the wearable audio device.

20. The method of claim 19, wherein the comparison includes a similarity analysis between the data from the inertial measurement unit and the output audio data.

* * * * *